(12) United States Patent
Fu et al.

(10) Patent No.: US 10,134,249 B2
(45) Date of Patent: Nov. 20, 2018

(54) METHOD AND DEVICE FOR SENDING MESSAGE

(71) Applicant: Xiaomi Inc., Beijing (CN)

(72) Inventors: Qiang Fu, Beijing (CN); Yang Wang, Beijing (CN); Ting Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 308 days.

(21) Appl. No.: 14/996,686

(22) Filed: Jan. 15, 2016

(65) Prior Publication Data

US 2016/0210827 A1 Jul. 21, 2016

(30) Foreign Application Priority Data

Jan. 15, 2015 (CN) .......................... 2015 1 0020652
Jan. 28, 2015 (CN) .......................... 2015 1 0042057

(51) Int. Cl.
| | |
|---|---|
| G08B 13/08 | (2006.01) |
| H04L 12/28 | (2006.01) |
| H04W 4/02 | (2018.01) |
| H04L 29/08 | (2006.01) |
| H04W 4/04 | (2009.01) |
| H04W 4/12 | (2009.01) |
| G08B 25/10 | (2006.01) |

(52) U.S. Cl.
CPC .............. *G08B 13/08* (2013.01); *G08B 25/10* (2013.01); *H04L 12/2825* (2013.01); *H04L 67/12* (2013.01); *H04L 67/18* (2013.01); *H04W 4/02* (2013.01); *H04W 4/043* (2013.01); *H04W 4/12* (2013.01)

(58) Field of Classification Search
CPC ..... G08B 13/08; G08B 25/10; H04L 12/2825; H04L 67/12; H04L 67/18; H04L 67/22; H04W 4/02; H04W 4/043; H04W 4/12
See application file for complete search history.

(56) References Cited

U.S. PATENT DOCUMENTS

| | | | |
|---|---|---|---|
| 4,360,801 A * | 11/1982 | Duhame | ............... G08B 17/117 |
| | | | 318/16 |
| 5,504,482 A | 4/1996 | Schreder | |
| 5,650,770 A | 7/1997 | Schlager et al. | |
| 7,061,377 B1 * | 6/2006 | Kraus | ................ A47G 29/1214 |
| | | | 340/545.1 |

(Continued)

FOREIGN PATENT DOCUMENTS

| | | |
|---|---|---|
| CN | 201001141 Y | 1/2008 |
| CN | 201654967 U | 11/2010 |

(Continued)

OTHER PUBLICATIONS

Search Report for Russian Application No. 2016102957/08(004399), dated May 15, 2017.

(Continued)

*Primary Examiner* — Quang D Pham
(74) *Attorney, Agent, or Firm* — Finnegan, Henderson, Farabow, Garrett & Dunner LLP

(57) ABSTRACT

A method for sending a message is provided. The method includes: detecting whether a user is located in a target place; if the user is not located in the target place, detecting whether an entrance of the target place is opened; and if the entrance of the target place is opened, sending a prompt message to a device carried by the user.

13 Claims, 8 Drawing Sheets

(56) References Cited

U.S. PATENT DOCUMENTS

| | | | | |
|---|---|---|---|---|
| 7,515,063 | B2* | 4/2009 | Brundula | E05F 15/77 |
| | | | | 340/12.54 |
| 9,000,896 | B1* | 4/2015 | Kim | H04L 47/41 |
| | | | | 340/10.5 |
| 9,208,629 | B2 | 12/2015 | Saladin et al. | |
| 9,246,921 | B1* | 1/2016 | Vlaminck | H04L 63/10 |
| 9,331,749 | B2* | 5/2016 | Kuroyama | G08C 17/02 |
| 9,920,934 | B2* | 3/2018 | Donarski | F24C 7/087 |
| 2004/0254649 | A1* | 12/2004 | Huang | G05B 19/0423 |
| | | | | 700/2 |
| 2006/0007005 | A1* | 1/2006 | Yui | G07C 1/10 |
| | | | | 340/573.4 |
| 2009/0096606 | A1* | 4/2009 | Janov | G07C 9/00182 |
| | | | | 340/540 |
| 2010/0207750 | A1* | 8/2010 | Fujisawa | B60K 35/00 |
| | | | | 340/438 |
| 2010/0273452 | A1* | 10/2010 | Rajann | H04W 8/22 |
| | | | | 455/411 |
| 2010/0292961 | A1* | 11/2010 | Moss | G01D 4/002 |
| | | | | 702/188 |
| 2012/0190379 | A1 | 7/2012 | Hassan et al. | |
| 2013/0093627 | A1* | 4/2013 | Cosman | H04W 64/00 |
| | | | | 342/451 |
| 2014/0227975 | A1* | 8/2014 | Kuroyama | G08C 17/02 |
| | | | | 455/41.1 |
| 2014/0247128 | A1* | 9/2014 | Young | G08B 3/10 |
| | | | | 340/541 |
| 2014/0266669 | A1 | 9/2014 | Fadell et al. | |
| 2014/0266698 | A1 | 9/2014 | Hall et al. | |
| 2014/0266710 | A1 | 9/2014 | Nguyen et al. | |
| 2015/0081207 | A1* | 3/2015 | Briant | G06F 17/3087 |
| | | | | 701/410 |
| 2015/0084779 | A1 | 3/2015 | Saladin et al. | |
| 2015/0281656 | A1* | 10/2015 | Chien | H04L 67/18 |
| | | | | 348/143 |
| 2015/0288745 | A1* | 10/2015 | Moghaddam | H04W 4/02 |
| | | | | 707/748 |
| 2015/0293509 | A1* | 10/2015 | Bankowski | G05B 15/02 |
| | | | | 700/275 |
| 2016/0189529 | A1* | 6/2016 | Lee | G08B 25/008 |
| | | | | 340/541 |
| 2016/0192458 | A1* | 6/2016 | Keith | H05B 37/0209 |
| | | | | 315/291 |
| 2016/0258202 | A1* | 9/2016 | Scalisi | G07C 9/00309 |

FOREIGN PATENT DOCUMENTS

| | | |
|---|---|---|
| CN | 102480682 A | 5/2012 |
| CN | 102722949 A | 10/2012 |
| CN | 102881123 A | 1/2013 |
| CN | 103324185 A | 9/2013 |
| CN | 103901850 A | 7/2014 |
| CN | 203759830 U | 8/2014 |
| CN | 104703147 A | 6/2015 |
| CN | 104954733 A | 9/2015 |
| EP | 2 122 593 | 7/2008 |
| JP | 2000171075 A | 6/2000 |
| JP | 2005301778 A | 10/2005 |
| JP | 2007028572 A | 2/2007 |
| JP | 2008027388 A | 2/2008 |
| JP | 2009543075 A | 12/2009 |
| RU | 2 198 800 C1 | 2/2003 |
| RU | 71099 U1 | 2/2008 |
| RU | 91035 U1 | 1/2010 |
| RU | 2 390 851 C1 | 5/2010 |
| RU | 104751 U1 | 5/2011 |
| RU | 111940 U1 | 12/2011 |

OTHER PUBLICATIONS

English version of International Search Report of PCT Application No. PCT/CN2015/093220, dated Feb. 15, 2016, issued by the ISA/CN—State Intellectual Property Office of the P.R. China.

* cited by examiner

METHOD AND DEVICE FOR SENDING MESSAGE

CROSS-REFERENCE TO RELATED APPLICATIONS

The present application is based upon and claims priority to Chinese Patent Application No. 201510020652.6 filed Jan. 15, 2015 and Chinese Patent Application No. 201510042057.2 filed Jan. 28, 2015, the entire contents of all of which are incorporated herein by reference.

TECHNICAL FIELD

The present disclosure generally relates to the field of computer technology, and more particularly, to a method and a device for sending a message.

BACKGROUND

When a user left his residence with a door or a window opened, an unauthorized party might break into his residence through an opened door or window, causing serious property damages. Accordingly, it is desirable if the state of the door and window could be acquired after the user left his residence and the user could be prompted when the door or window is opened.

A method for sending a message in the related art includes: installing a sensor in advance on the door and window; and setting an absent time period when the user will not be in the residence. A server detects whether the door or window is opened during the absent time period. If the door or the window is opened during the absent time period, the server sends a prompt message to a terminal device of the user.

SUMMARY

According to a first aspect of the present disclosure, there is provided a method for sending a message. The method includes: detecting whether a user is located in a target place; if the user is not located in the target place, detecting whether an entrance of the target place is opened; and if the entrance of the target place is opened, sending a prompt message to a device carried by the user.

According to another aspect of the present disclosure, there is provided a device for sending a message. The device includes a processor and a memory for storing instructions executable by the processor. The processor is configured to perform: detecting whether a user is located in a target place; if the user is not located in the target place, detecting whether an entrance of the target place is opened; and if the entrance of the target place is opened, sending a prompt message to a device carried by the user.

According to another aspect of the present disclosure, there is provided a non-transitory computer-readable storage medium storing instructions that, when executed by a processor of a device, cause the device to perform: detecting whether a user is located in a target place; if the user is not located in the target place, detecting whether an entrance of the target place is opened; and if the entrance of the target place is opened, sending a prompt message to a device carried by the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
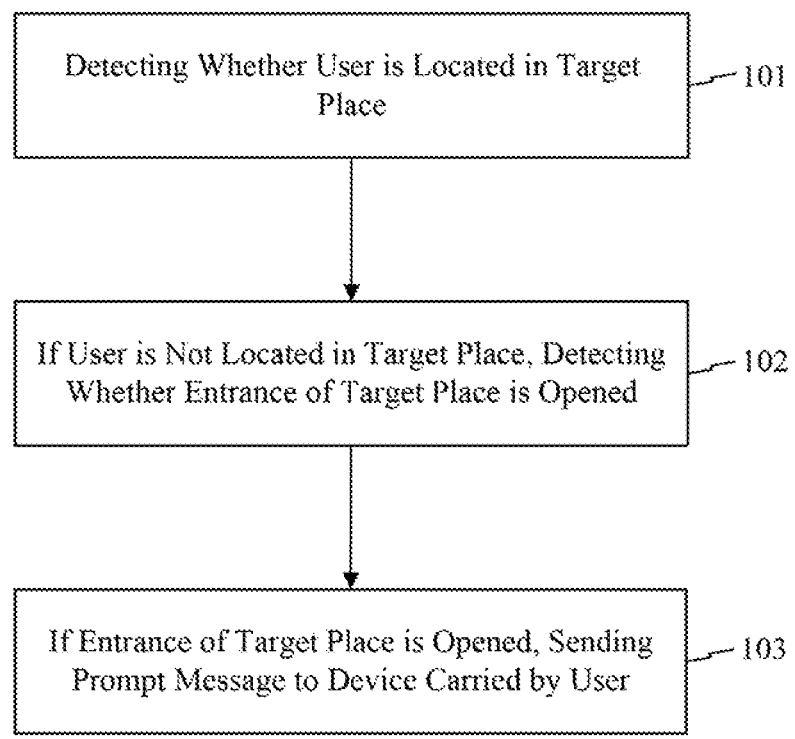
FIG. 1 is a flow chart showing a method for sending a message according to an exemplary embodiment of the present disclosure.

FIG. 1 is a flow chart of a method 100 for sending a message according to an exemplary embodiment, which may be performed by a server device. As shown in FIG. 1, the method 100 for sending a message includes the following steps.

In step 101, it is detected whether a user is located in a target place.

In step 102, if the user is not located in the target place, it is detected whether an entrance, such as a door or window, of the target place is opened.

In step 103, if an entrance of the target place is opened, a prompt message is sent to a device carried by the user.

Accordingly, in the method 100 for sending a message provided by the present disclosure, it is detected whether a user is located in a target place. If the user is not located in the target place, it is detected whether a door or a window of the target place is opened. If a door or a window of the target place is opened, a prompt message is sent to a device carried by the user. The method 100 detects whether the user is located in the target place directly rather than detecting the user's absence based on the absent time period that the user sets. Thus, it can solve the problem that the user might leave the residence during a time other than the absent time period, which may cause inaccuracy in sending a prompt message. Therefore, the method 100 can send an accurate prompt message to the user in case there is an unauthorized entry.

Figure 2A:
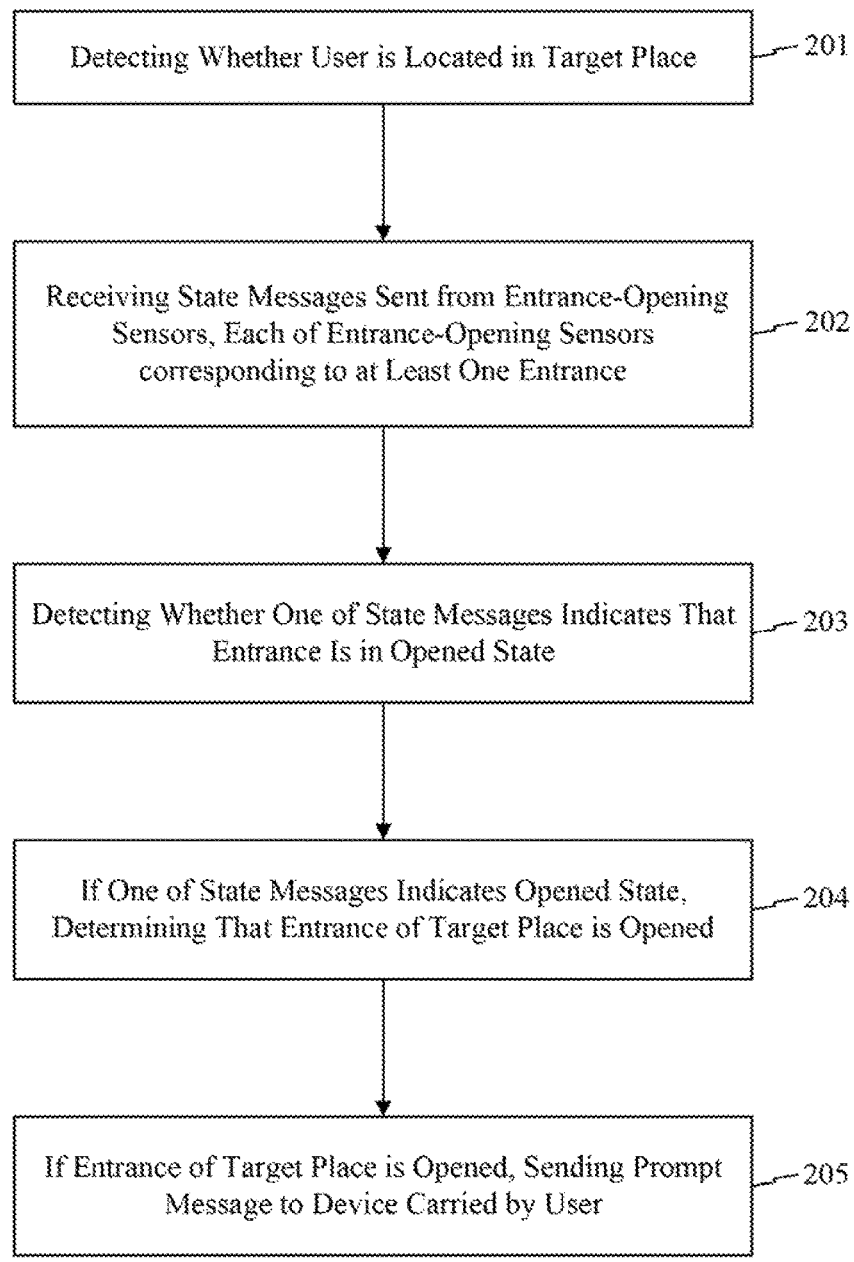
FIG. 2A is a flow chart showing a method for sending a message according to another exemplary embodiment of the present disclosure.

FIG. 2A is a flow chart of a method 200 for sending a message according to another exemplary embodiment, which may be performed by a server device. As shown in FIG. 2A, the method 200 for sending a message includes the following steps.

In step 201, it is detected whether a user is located in a target place.

The target place is a place to be monitored, which can be a residence of the user or a company building where the user is located. The target place can be one place or more than one place. The number of the target place is not limited in the present embodiment.

When the user is located in the target place, an unauthorized party generally would not break into the target place, e.g., to steal property. In this case, the target place has a higher level of security and may not need to be monitored. When the user is not located in the target place, however, an unauthorized party is more likely to break into the target place, e.g., to steal property. In this case, the target place has a lower level of security and needs to be monitored. Accordingly, in the present embodiment, the results of detecting whether the user is located in the target place can be used to determine whether the target place needs to be monitored.

The present embodiment provides two exemplary methods, which may be performed by a server device, for detecting whether the user is located in the target place, described as follows.

In the first detecting method, a first message sent from a device in the target place is received, and whether the user is located in the target place is determined based on the first message.

The device in the target place can be an infrared sensor, a smart camera, a smart TV, a smart router, a smart lamp or the like, which is placed in the target place. The first message may be a message acquired by the device in the target place, which describes one or more aspects of the target place.

In the present embodiment, the first message may be, for example, a message indicating a movement of a person in the target place or a monitoring message. Detecting whether the user is located in the target place based on the first message includes the following steps.

(1) When the first message is a movement-indicating message indicating a movement of a person, the server device detects whether a person is moving in the target place during a preset time period based on the movement-indicating message.

(2) When the first message is a monitoring message obtained from monitoring of the target place, the server device detects whether the user has left the target place based on the monitoring message.

First, the movement-indicating message can be used to indicate that a person is moving or no person is moving in the target place. In the present embodiment, the movement-indicating message indicates that no person is moving.

When the first message is a movement-indicating message, the device for acquiring the first message can be an infrared sensor. The technique of the infrared sensor monitoring movement of a person is well known, which will not be elaborated herein.

Sometimes the user is currently located in the target place but moving in an area out of the monitoring range of the infrared sensor, causing inaccuracy in generating the movement-indicating message. In the present embodiment, a preset time period can be set in advance, and the infrared sensor can monitor the movement of a person during the preset time period. The starting moment of the preset time period can be a moment when it starts to sense that no person is moving. The preset time period can be set in default, by the user, or by the server device, and can be 1 hour, 2 hours, and so on. For example, if the infrared sensor starts to sense that no person is moving at 3 o'clock, and the preset time period lasts for 2 hours, then the infrared sensor monitors the target place from 3 o'clock to 5 o'clock.

In one embodiment, when the infrared sensor determines that there is no movement of a person in the target place for a preset time period, a movement-indicating message is generated and sent to the server device. The server device determines that the user is not located in the target place based on the movement-indicating message. In another embodiment, the infrared sensor sends a movement-indicating message to the server device at a preset time interval, e.g., every other twenty minutes. When the server device determines that all of the movement-indicating messages received during the preset time period indicate no movement of a person, the server device determines that the user is not located in the target place.

Second, the monitoring message can be used to indicate the behavior of the user in the target place. For example, when the monitoring message is a video message and the device for acquiring the first message is a smart camera, the monitoring message can be used to indicate whether the user goes out of the target place, or whether the user enters the target place. When the monitoring message is a message indicating the usage of a smart home appliance, the device for acquiring the first message can be a smart TV or the like. The monitoring message can be used to indicate the behavior of the user in the target place.

After it receives the monitoring message sent from the device in the target place, the server device analyzes the monitoring message and determines whether the user is located in the target place. For example, when the monitoring message indicates that the user goes out of the target place in a video, it can be determined that the user is not located in the target place. When the monitoring message indicates that the user enters the target place, it can be determined that the user is located in the target place. When the monitoring message indicates that the user is turning on the smart TV, it can be determined that the user is located in the target place.

In the second detecting method, a server device receives a second message sent from a device carried by the user, and detects whether the user is located in the target place based on the second message and a pre-stored message corresponding to the target place. The second message indicates a location of the user, and the pre-stored message indicates a location of the target place.

Since the second message indicates the location of the user, and the pre-stored message indicates the location of the target place, the server device can determine whether the user is located in the target place depending on whether the two locations are identical.

Detecting whether the user is located in the target place based on the second message and a pre-stored message corresponding to the target place includes the following methods.

(1) When the second message is a first device list and the pre-stored message is a second device list, the server device detects whether the user is located in the target place based on similarity between the first device list and the second device list. The first device list is a list of devices which are connected in a first network covering a place where the user is currently located, and the second device list is a list of devices which are connected in a second network covering the target place.

(2) When the second message is a first location message of a wearable device of the user and the pre-stored message is a second location message of the target place, the server device detects whether the user is located in the target place based on the first location message and the second location message.

First, assuming that the user is located in a current place, the server device is configured to detect whether the current place is the target place. In one embodiment, the server device detects whether the first network covering the current place and the second network covering the target place are identical. If the first network is identical to the second network, it can be determined that the current place is the target place and the user is located in the target place. If the first network is different from the second network, it can be determined that the current place is not the target place and the user is not located in the target place. The first network and the second network may be networks of the same type, such as Widely Fidelity (WiFi) networks.

Detecting whether the first network is identical to the second network may be performed by detecting whether the name of the first network is identical to the name of the second network. In this case, if the first network is different from the second network while having an identical name, the server device may determine that the first network is identical to the second network, causing an error. Accordingly, after the server device determines that the name of the first network is identical to that of the second network, it further detects whether the first network is identical to the second network based on the first device list of the first network and the second device list of the second device list. The first device list is a list of devices which are connected in the first network, and the second device list is a list of devices which are connected in the second network.

If the first network is a network in the user's residence, then the first device list may include device information, for example, of an infrared sensor, a smart camera, and/or a smart TV. If the second network is a network in the user's company, then the second device list may contain device information, for example, of a computer, a smart printer, and/or a smart water dispenser.

Since the user may occasionally replace a device in a place, or the user does not turn on some of the devices in the place, the device list even of the same place can be different. Accordingly, in order to improve the detecting accuracy, the server device may detect the similarity between the first device list and the second device list. If the similarity is larger than a predetermined degree, it can be determined that the first network is identical to the second network, that the current place is the target place, and that the user is located in the target place. If the similarity is smaller than a predetermined degree, it can be determined that the first network is different from the second network, that the current place is not the target place, and that the user is not located in the target place. The predetermined degree can be a default value, or set by the user or the server device.

If the similarity between the first device list and the second device list is a number of devices that appear in both of the lists, the predetermined degree can be 1, 5, or other suitable numbers. If the similarity between the first device list and the second device list is a ratio of a number of devices that appear in both of the lists to a total number of the devices in both lists, the predetermined degree can be 10%, 20%, or other ratios.

Figure 2B:
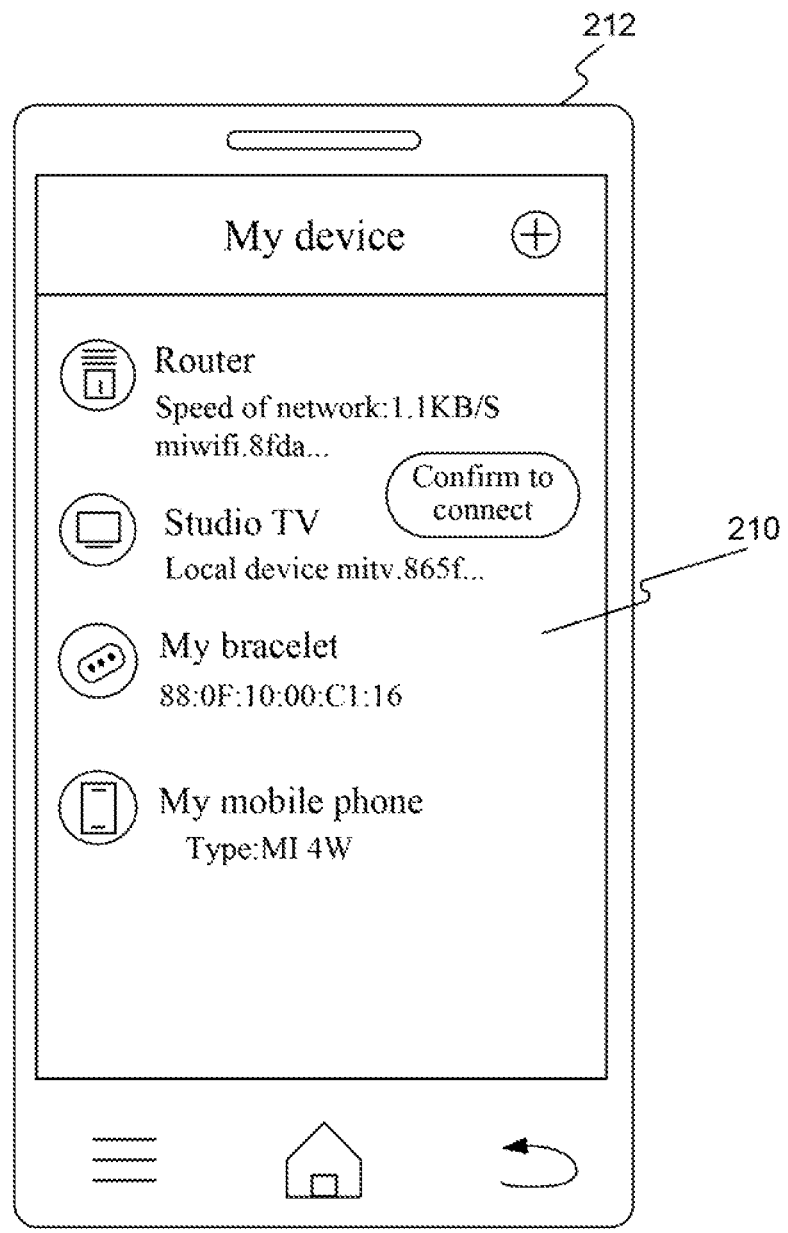
FIG. 2B is a schematic diagram illustrating a second device list according to an exemplary embodiment of the present disclosure.

In some embodiments, the second device list can be pre-stored in the server device. In one embodiment, a terminal device of the user can display options of places after it is connected to the second network. After the user selects an option of, for example, "home", the terminal device scans for devices connected to the second network, records information of the devices in the second device list, and sends the second device list to the server device. FIG. 2B is a schematic diagram illustrating an exemplary second device list 210, displayed on a terminal device 212. As shown in FIG. 2B, the second device list 210 includes a router, a studio TV, my bracelet, and my mobile phone. The second device list also includes description information, such as the identification of each device and the like.

Figure 2C:
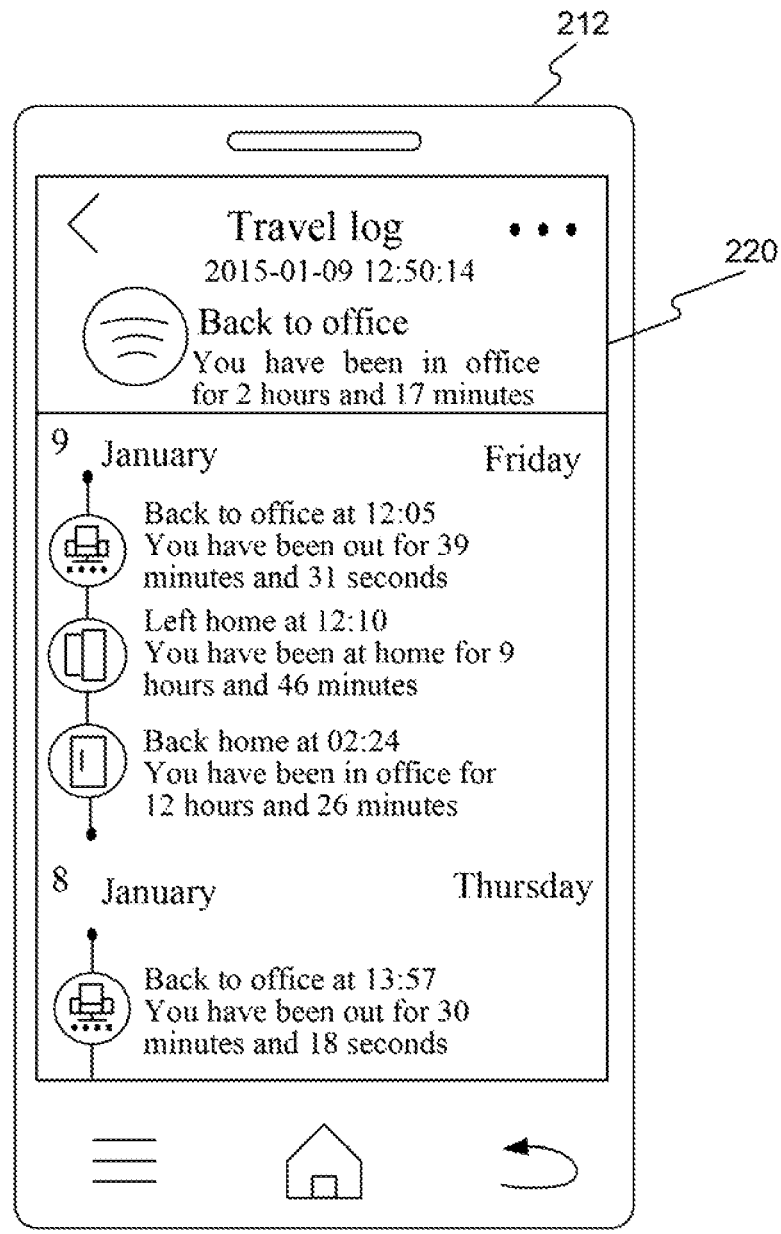
FIG. 2C is a schematic diagram illustrating a travel log according to an exemplary embodiment of the present disclosure.

The user can also obtain a third device list of a third network covering the work place. In this case, the terminal device of the user can generate a travel log of the user according to the first device list, the second device list, and the third device list. FIG. 2C is a schematic diagram illustrating a travel log 220. As shown in FIG. 2C, the travel log 220 of the user on January 9 is illustrated. For example, the user went back to home at 02:24, and left home at 12:10, returned to the office at 12:05, and so on.

Second, a first location message can be acquired through a device carried by the user. Based on the first location message, the server device can detect whether the first location message matches the second location message of the target place. The device carried by the user can be a terminal device, a wearable device, and the like. In the present embodiment, the device carried by the user is a wearable device, for example.

In some embodiments, the location messages can be a geographic position message, or an Internet Protocol (IP) address, or any other message indicating a geographic position. Whether the user is located in the target place based on the first location message and the second location message can be detected by the following methods.

(1) When the first location message is a geographic position message of the wearable device and the second location message is a geographic position message of the target place, the server device determines that the user is located in the target place when a distance between the wearable device and the target place is less than a preset threshold.

(2) When the first location message is an IP address of the wearable device and the second location message is an address of a network segment corresponding to the target place, the server device determines that the user is located in the target place when the IP address of the wearable device is contained in the address of the network segment.

First, when the first location message is a geographic position message, the wearable device can acquire the geographic position message through, for example, a positioning system, and send the geographic position message to the server device. The server device retrieves a pre-stored geographic position message corresponding to the target place, and detects whether a distance between the wearable device and the target place is less than a preset threshold. If the distance between the wearable device and the target place is less than the preset threshold, it determines that the user is located in the target place. If the distance between the wearable device and the target place is larger than the preset threshold, it determines that the user is not located in the target place. The preset threshold can be a default value, or set by the user or by the server device, such as 10 m, 100 m, and so on.

Second, the second network covering the target place is generally corresponding to a network segment. When the first location message is an IP address, the server device can detect whether the IP address is contained in the address of the network segment of the target place. If the IP address is contained in the address of the network segment, it can determine that the wearable device is connected in the second network and that the user is located in the target place. If the IP address is not contained in the address of the network segment, it can determine that the wearable device is not connected in the second network and that the user is not located in the target place.

Referring back to FIG. 2A, when it is determined that the user is not located in the target place through the above methods, the method 200 proceeds to step 202. When it is determined that the user is located in the target place through the above methods, the current process is finished, until the method 200 for sending a message is resumed again.

In step 202, if the user is not located in the target place, state messages sent from entrance, e.g., a door or window, opening sensors of the target place are received. Each of the entrance opening sensors corresponds to at least one entrance of the target place.

When the user is not located in the target place, an unauthorized party might break into the target place through an opened door or window. Accordingly, the server device is configured to acquire the state of the doors and windows in the target place. The target place includes at least one door or window, or other entry means to the target place.

In the present embodiment, the user can mount an entrance-opening sensor (such as door-window opening sensor) on each of the entrances in advance, for acquiring the state of the entrances and generating state messages which indicate whether the entrances are opened or closed. The entrance-opening sensor can be at least one of a magnetic sensor, a pressure sensor, a proximity switch sensor, a displacement sensor or a sensor of other type which can detect the opening state of the entrance.

In one embodiment, after it determines that the user is not located in the target place, the server device sends a state-acquiring instruction to each door-window opening sensor. Based on the instruction, each door-window opening sensor acquires a state of the door or window, and generates and sends a status message to the server device.

In step 203, it is detected whether one of the state messages indicates that a door or window is an opened state.

The server device can search for a state message indicating that a door or window is in an opened state, among all of the received state messages. If it finds a state message indicating an opened state, step 204 is performed. If it does not find a state message indicating an opened state, it determines that all of the doors and the windows in the target place are closed, and the current process is finished, until the method 200 for sending a message is resumed again.

In step 204, if one of the state messages indicates an opened state, it is determined that a door or window of the target place is opened.

In step 205, if a door or window of the target place is opened, a prompt message is sent to a device carried by the user.

The server device can generate and send a prompt message to the device carried by the user. For example, the server device may first send the prompt message to a terminal device of the user. If the terminal device does not return a message indicating it receives an operation in response to the prompt message from the user, then the server device can send the prompt message to a wearable device of the user.

Figure 2D:
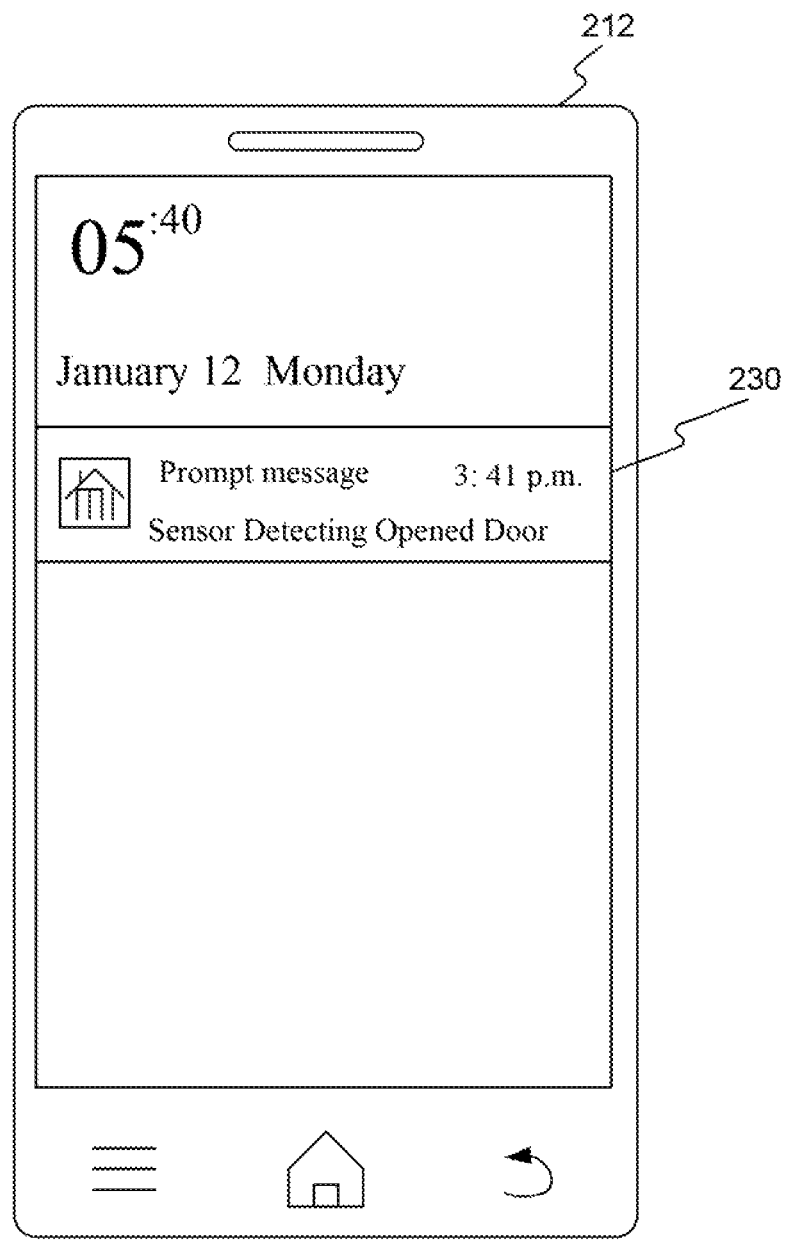
FIG. 2D is a schematic diagram illustrating a prompt message according to an exemplary embodiment of the present disclosure.

The prompt message can be a text message, a picture message, or a multimedia message. In the present embodiment, the prompt message is a text message, for example. FIG. 2D is a schematic diagram illustrating a prompting message 230 displayed on the terminal device 212. As shown in FIG. 2D, the prompt message 230 is: "Sensor Detecting Opened Door." After it receives the prompt message 230, the terminal device 212 can present the prompt message 230 to the user via a display, for example.

In some embodiments, the server device can also determine a position of the door or window that is opened based on the door-window opening sensors. For example, the server device receives a state message indicating an opened state which is sent from a door-window opening sensor in a bedroom. The server device determines that the window of the bedroom is opened and generates a prompt message of "Sensor Detecting Window of Bedroom Opened".

In some embodiments, the server device can set in advance a corresponding relationship between the device carried by the user, the devices in the target place, the second device list and the door-window opening sensors in the target place.

In some embodiments, the above methods can be performed in the server device, or can also be performed in other device adapted for sending a prompt message.

In some embodiments, the above methods can be triggered by an event, or can also be performed periodically, that is, periodically detecting whether the user is located in the target place and then performing the subsequent steps. The period for performing the above method can be set in default, by the user, or by the server device, such as 1 minute, 5 minutes, and so on.

Accordingly, in the method 100 or 200 for sending a message provided by the present disclosure, it is detected whether a user is located in a target place. If the user is not located in the target place, it is detected whether a door or a window of the target place is opened. If a door or window of the target place is opened, a prompt message is sent to a device carried by the user. Thereby, whether the user is located in the target place is directly detected, rather than detecting that a door or window is opened based on the preset absent time period. Thus, it can solve the problem that the user might leave the residence during a time other than the absent time period, which may cause inaccuracy in sending a prompt message. Therefore, the method 100 or 200 can send a more accurate prompt message to the user in case there is an unauthorized entry.

In some embodiments, when the second message is a first device list and the pre-stored message is a second device list, it is detected whether the user is located in the target place based on similarity between the first device list and the second device list. Thereby, it can determine whether the user is located in the target place based on the devices connected in the network, thus improving the accuracy in detection.

Figure 3:
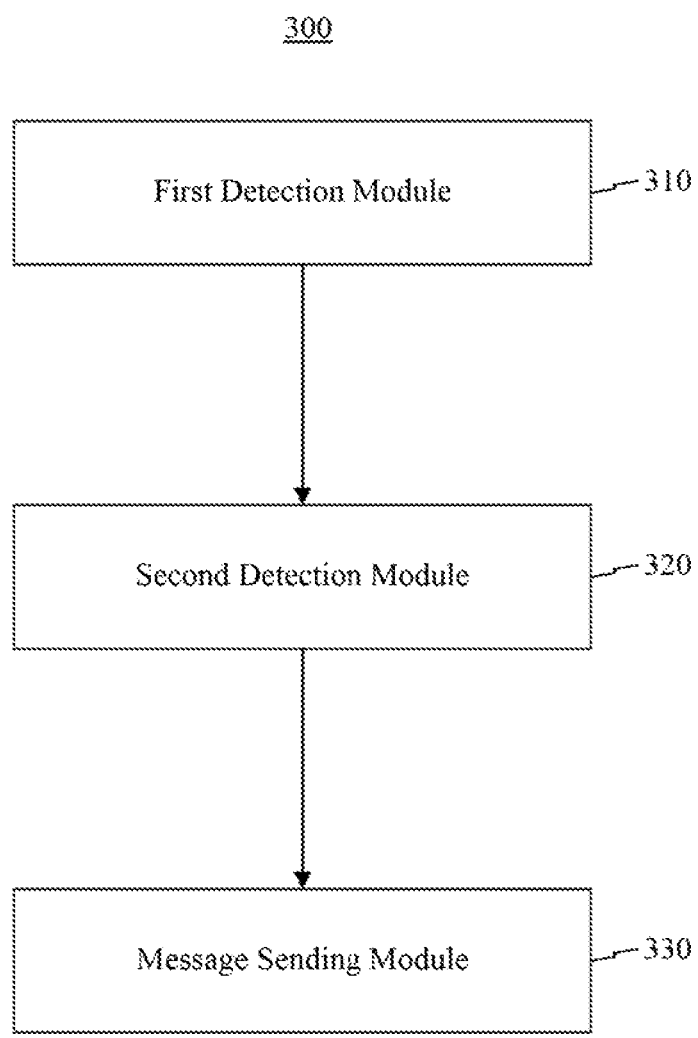
FIG. 3 is a block diagram of a device for sending a message according to an exemplary embodiment of the present disclosure.

FIG. 3 is a block diagram of a device 300 for sending a message according to an exemplary embodiment. The device 300 may be, for example, a server device. As shown in FIG. 3, the device 300 for sending a message includes: a first detection module 310, a second detection module 320, and a message sending module 330.

The first detection module 310 is configured to detect whether a user is located in a target place.

The second detection module 320 is configured to, if the first detection module 310 detects that the user is not located in the target place, detect whether a door or window of the target place is opened.

The message sending module 330 is configured to, if the second detection module 320 detects that a door or window of the target place is opened, send a prompt message to a device carried by the user.

Accordingly, in the device 300 for sending a message provided by the present disclosure, whether a user is located in a target place is detected. If the user is not located in the target place, whether a door or window of the target place is opened is detected. If a door or window of the target place is opened, a prompt message is sent to a device carried by the user. Thereby, whether the user is located in the target place is directly detected, rather than detecting that a door or window is opened based on the preset absent time period. Thus, it can solve the problem that the user might leave the residence during a time other than the absent time period, which may cause inaccuracy in sending a prompt message. Therefore, the device 300 can send a more accurate prompt message to the user in case there is an unauthorized entry.

Figure 4:
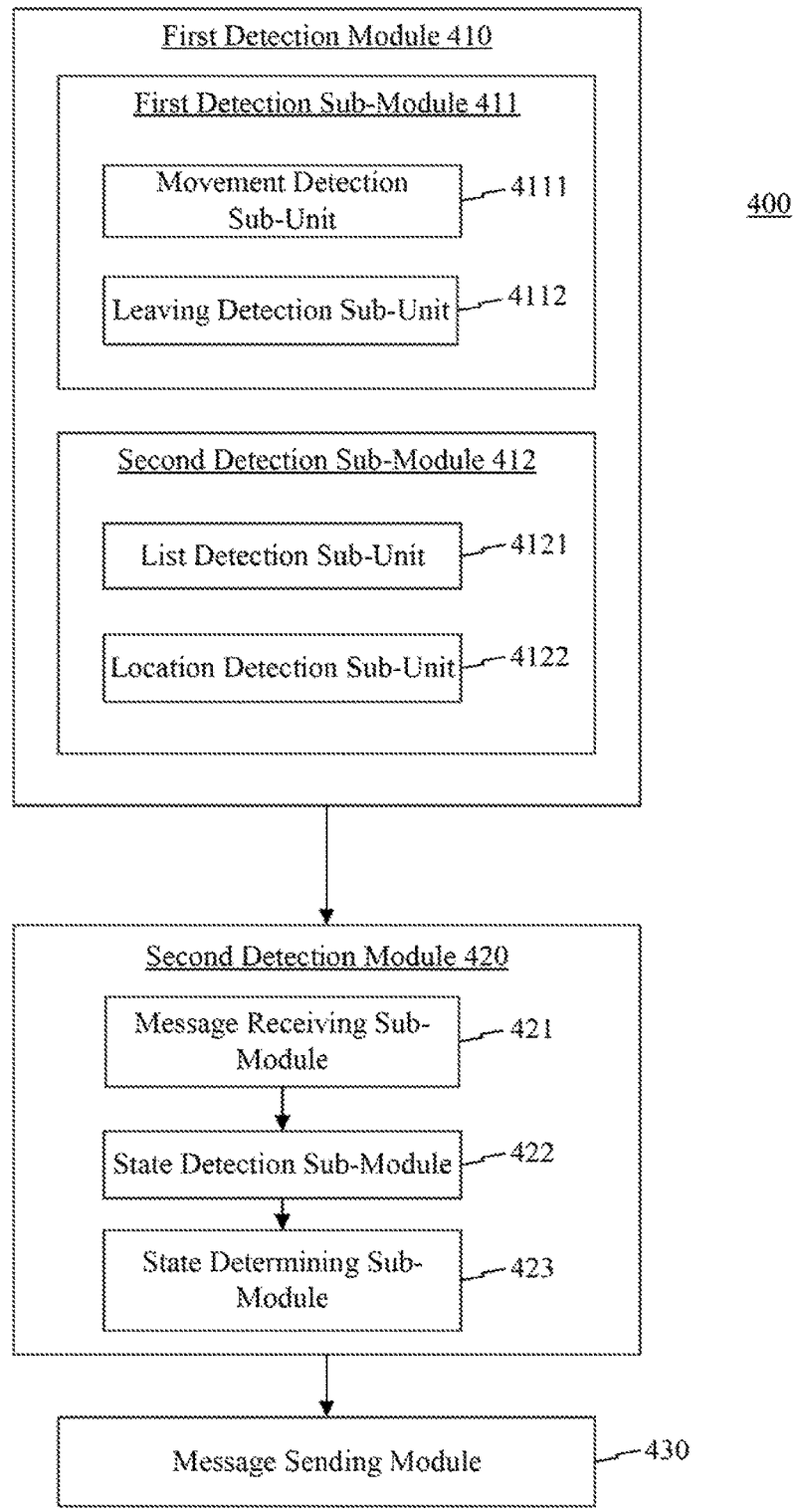
FIG. 4 is a block diagram of a device for sending a message according to an exemplary embodiment of the present disclosure.

FIG. 4 is a block diagram of a device 400 for sending a message according to an exemplary embodiment. The device 400 may be a server device. As shown in FIG. 4, the device 400 for sending a message includes: a first detection module 410, a second detection module 420, and a message sending module 430.

The first detection module 410 is configured to detect whether a user is located in a target place.

The second detection module 420 is configured to, if the first detection module 410 detects that the user is not located in the target place, detect whether a door or window of the target place is opened.

The message sending module 430 is configured to, if the second detection module 420 detects that a door or window of the target place is opened, send a prompt message to a device carried by the user.

In some embodiments, the first detection module 410 includes: a first detection sub-module 411 and/or a second detection sub-module 412.

The first detection sub-module 411 is configured to receive a first message sent from a device in the target place, and detect whether the user is located in the target place based on the first message.

The second detection sub-module 412 is configured to receive a second message sent from the device carried by the user, and detect whether the user is located in the target place based on the second message and a pre-stored message corresponding to the target place. The second message indicates a location of the user and the pre-stored message indicates a location of the target place.

In some embodiments, the first detection sub-module 411 includes: a movement detection sub-unit 4111 and/or a leaving detection sub-unit 4112.

The movement detection sub-unit 4111 is configured to, when the first message is a movement-indicating message, detect whether a person is moving in the target place during a preset time period based on the movement-indicating message.

The leaving detection sub-unit 4112 is configured to, when the first message is a monitoring message obtained from monitoring of the target place, detect whether the user has left the target place based on the monitoring message.

In some embodiments, the second detection sub-module 412 includes: a list detection sub-unit 4121 and/or a location detection sub-unit 4122.

The list detection sub-unit 4121 is configured to, when the second message is a first device list and the pre-stored message is a second device list, detect whether the user is located in the target place based on similarity between the first device list and the second device list. The first device list is a list of devices that are connected in a first network covering a place where the user is currently located, and the second device list is a list of devices that are connected in a second network covering the target place.

The location detection sub-unit 4122 is configured to, when the second message is a first location message of a wearable device of the user and the pre-stored message is a second location message of the target place, detect whether the user is located in the target place based on the first location message and the second location message.

In some embodiments, the location detection sub-unit 4122 is further configured to: when the first location message is a geographic position message of the wearable device and the second location message is a geographic position message of the target place, detect whether a distance between the wearable device and the target place is less than a predetermined threshold; or when the first location message is an IP address of the wearable device and the second location message is an address of a network segment corresponding to the target place, detect whether the IP address of the wearable device is contained in the address of the network segment.

In some embodiments, the second detection module 420 includes: a message receiving sub-module 421, a state detection sub-module 422, and a state determining sub-module 423.

The message receiving sub-module 421 is configured to receive state messages sent from door-window opening sensors of the target place, each of the door-window opening sensors corresponding to one door or window.

The state detection sub-module 422 is configured to detect whether one of the state messages indicates that an entrance, such as a door or window, is in an opened state.

The state determining sub-module 423 is configured to, if the state detection sub-module 422 detects that one of the state messages indicates an opened state, determine that a door or window of the target place is opened.

Accordingly, in the device 400 for sending a message provided by the present disclosure, it is detected whether a user is located in a target place. If the user is not located in the target place, it is detected whether a door or window of the target place is opened. If a door or window of the target place is opened, a prompt message is sent to a device carried by the user. Thereby, whether the user is located in the target place is directly detected, rather than detecting that a door or window is opened based on the preset absent time period. Thus, it can solve the problem that the user might leave the residence during a time other than the absent time period, which may cause inaccuracy in sending a prompt message. Therefore, the device 400 can send a more accurate prompt message to the user in case there is an unauthorized entry.

In some embodiments, when the second message is a first device list and the pre-stored message is a second device list, it is detected whether the user is located in the target place based on similarity between the first device list and the second device list. Thereby, it can determine whether the user is located in the target place based on the devices connected in the network, thus improving the detecting accuracy.

With respect to the devices 300 and 400 in the above embodiments, the specific manners for performing operations for individual modules and sub-modules therein have been described in detail in the embodiments regarding the relevant methods 100 and 200, which will not be elaborated herein.

An exemplary embodiment of the present disclosure provides a device for sending a message, which can implement the methods 100 and 200 for sending a message. The device for sending a message includes: a processor; and a memory for storing instructions executable by the processor;

The processor is configured to perform: detecting whether a user is located in a target place; if the user is not located in the target place, detecting whether a door or a window of the target place is opened; and if a door or a window of the target place is opened, sending a prompt message to a device carried by the user.

Figure 5:
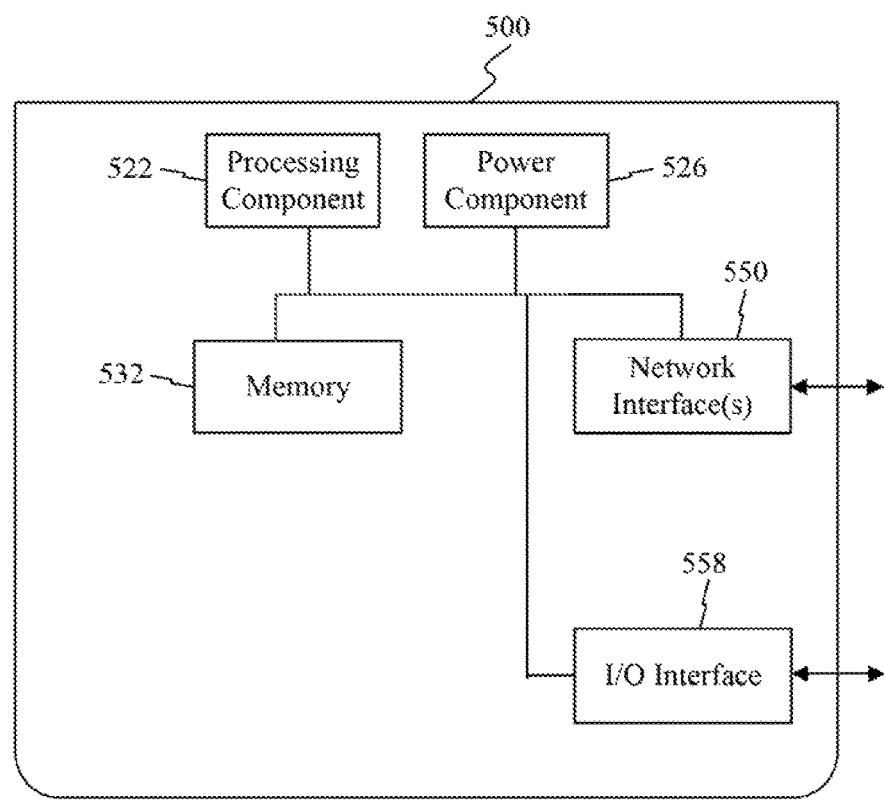
FIG. 5 is a block diagram of a device for sending a message according to an exemplary embodiment of the present disclosure.

FIG. 5 is a block diagram of a device 500 for sending a message according to an exemplary embodiment. For example, the device 500 may be provided as a server device. Referring to FIG. 5, the device 500 includes a processing component 522 that further includes one or more processors, and memory resources represented by a memory 532 for storing instructions executable by the processing component 522, such as application programs. The application programs stored in the memory 532 may include one or more modules each corresponding to a set of instructions. Further, the processing component 522 is configured to execute the instructions to perform the above described method for sending a message.

The device 500 may also include a power component 526 configured to perform power management of the device 500, wired or wireless network interface(s) 550 configured to connect the device 500 to a network, and an input/output (I/O) interface 558. The device 500 may operate based on an operating system stored in the memory 532, such as Windows Server™, Mac OS X™, Unix™, Linux™, FreeBSD™, or the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for sending a prompt message to a wearable device of a user to indicate a status of an entrance among a plurality of entrances of a target place, comprising:
   detecting, by a server device, whether the user is located in the target place based on a first message sent from the wearable device carried by the user and a pre-stored message corresponding to the target place, the first message indicating a location of the user and the pre-stored message indicating a location of the target place, wherein the server device determines whether the user is located in the target place based on whether the two locations are identical;
   if it is determined that the user is not located in the target place, detecting, by the server device, whether an entrance of the target place is opened; and
   if it is determined that the entrance of the target place is opened, sending, by the server device, the prompt message to the wearable device to indicate the state of the entrance to the user via the wearable device;
   wherein the server device determines whether the user is located in the target place based on the first message and the pre-stored message corresponding to the target place comprises:
      when the first message is a first device list and the pre-stored message is a second device list, detecting whether the user is located in the target place based on a similarity between the first device list and the second device list, the first device list being a list of devices which are connected in a first network covering a place where the user is currently located, and the second device list being a list of devices which are connected in a second network covering the target place; and
      when the first message is a first location message of the wearable device of the user and the pre-stored message is a second location message of the target place, detecting whether the user is located in the target place based on the first location message and the second location message; and
   wherein when the first location message is a geographic position message of the wearable device and the second location message is a geographic position message of the target place, detecting, by the server device, whether a distance between the wearable device and the target place is less than a predetermined threshold; and
   when the first location message is an Internet Protocol (IP) address of the wearable device and the second location message is an address of a network segment corresponding to the target place, detecting, by the server device, whether the IP address of the wearable device is contained in the address of the network segment.

2. The method of claim 1, wherein detecting whether the user is located in the target place further comprises:
   receiving, by the server device, a second message sent from a device in the target place, and
   detecting, by the server device, whether the user is located in the target place based on the second message.

3. The method of claim 2, wherein detecting, by the server device, whether the user is located in the target place based on the second message comprises:
   when the second message is a movement-indicating message, detecting whether the user is moving in the target place during a preset time period based on the movement-indicating message; and
   when the second message is a monitoring message obtained from monitoring of the target place, detecting whether the user leaves the target place based on the monitoring message.

4. The method of claim 3, wherein detecting whether an entrance of the target place is opened comprises:
   receiving state messages sent from entrance-opening sensors of the target place, each of the entrance-opening sensors being associated with a corresponding entrance of the plurality of the entrances;
detecting whether one of the state messages indicates that the corresponding entrance, of the target place is in an opened state; and
if it is detected that one of the state messages indicates that the corresponding entrance of the target place is in the opened state, determining that the corresponding entrance of the target place is opened.

5. The method of claim 1, wherein detecting, by the server device, whether the entrance among the plurality of the entrances of the target place is opened comprises:
receiving state messages sent from entrance-opening sensors of the target place, each of the entrance-opening sensors being associated with a corresponding entrance of the plurality of the entrances;
detecting whether one of the state messages indicates that the corresponding entrance of the target place is in an opened state; and
if it is detected that one of the state messages indicates that the corresponding entrance of the target place is in the opened state, determining that the corresponding entrance of the target place is opened.

6. The method of claim 2, wherein detecting, by the server device, whether the entrance among the plurality of the entrances of the target place is opened comprises:
receiving state messages sent from entrance-opening sensors of the target place, each of the entrance-opening sensors being associated with a corresponding entrance of the plurality of the entrances;
detecting whether one of the state messages indicates that the corresponding entrance of the target place is in an opened state; and
if it is detected that one of the state messages indicates that the corresponding entrance of the target place is in the opened state, determining that the corresponding entrance of the target place is opened.

7. A server device for sending a prompt message to a wearable device of a user to indicate a status of an entrance among a plurality of entrances of a target place, comprising:
a processor; and
a memory for storing instructions executable by the processor; wherein the processor is configured to perform:
detecting whether the user is located in the target place based on a first message sent from the wearable device carried by the user and a pre-stored message corresponding to the target place, the first message indicating a location of the user and the pre-stored message indicating a location of the target place, wherein the server device determines whether the user is located in the target place based on whether the two locations are identical;
if it is determined that the user is not located in the target place, detecting whether an entrance of the target place is opened; and
if it is determined that the entrance of the target place is opened, sending the prompt message to the wearable device to indicate the state of the entrance to the user via the wearable device;
wherein the server device determines whether the user is located in the target place based on the first message and the pre-stored message corresponding to the target place comprises:
when the first message is a first device list and the pre-stored message is a second device list, detecting whether the user is located in the target place based on a similarity between the first device list and the second device list, the first device list being a list of devices which are connected in a first network covering a place where the user is currently located, and the second device list being a list of devices which are connected in a second network covering the target place; and
when the first message is a first location message of the wearable device of the user and the pre-stored message is a second location message of the target place, detecting whether the user is located in the target place based on the first location message and the second location message; and
wherein when the first location message is a geographic position message of the wearable device and the second location message is a geographic position message of the target place, detecting whether a distance between the wearable device and the target place is less than a predetermined threshold; and
when the first location message is an Internet Protocol (IP) address of the wearable device and the second location message is an address of a network segment corresponding to the target place, detecting whether the IP address of the wearable device is contained in the address of the network segment.

8. The server device of claim 7, wherein the processor is further configured to perform:
receiving a second message sent from a device in the target place, and
detecting whether the user is located in the target place based on the second message.

9. The server device of claim 8, wherein the processor is further configured to perform:
when the second message is a movement-indicating message, detecting whether the user is moving in the target place during a preset time period based on the movement-indicating message; and
when the second message is a monitoring message obtained from monitoring of the target place, detecting whether the user leaves the target place based on the monitoring message.

10. The server device of claim 9, wherein the processor is further configured to perform:
receiving state messages sent from entrance-opening sensors of the target place, each of the entrance-opening sensors being associated with a corresponding entrance of the plurality of the entrances;
detecting whether one of the state messages indicates that the corresponding entrance of the target place is in an opened state; and
if it is detected that one of the state messages indicates that the corresponding entrance of the target place is in an opened state, determining that the corresponding entrance of the target place is opened.

11. The server device of claim 7, wherein the processor is further configured to perform:
receiving state messages sent from entrance-opening sensors of the target place, each of the entrance-opening sensors being associated with a corresponding entrance of the plurality of the entrances;
detecting whether one of the state messages indicates that the corresponding entrance of the target place is in an opened state; and
if it is detected that one of the state messages indicates that the corresponding entrance of the target place is in the opened state, determining that the corresponding entrance of the target place is opened.

12. The server device of claim 8, wherein the processor is further configured to perform:
   receiving state messages sent from entrance-opening sensors of the target place, each of the entrance-opening sensors being associated with a corresponding entrance of the plurality of the entrances;
   detecting whether one of the state messages indicates that the corresponding entrance of the target place is in an opened state; and
   if it is detected that one of the state messages indicates that the corresponding entrance of the target place is in an opened state, determining that the corresponding entrance of the target place is opened.

13. A non-transitory computer-readable storage medium storing instructions, for sending a prompt message to a wearable device of a user to indicate a status of an entrance among a plurality of entrances of a target place, that, when executed by a processor of a server device, cause the server device to perform:
   detecting whether the user is located in the target place based on a first message sent from the wearable device carried by the user and a pre-stored message corresponding to the target place, the first message indicating a location of the user and the pre-stored message indicating a location of the target place, wherein the server device determines whether the user is located in the target place depending on whether the two locations are identical;
   if it is determined that the user is not located in the target place, detecting whether an entrance of the target place is opened; and
   if it is determined that the entrance of the target place is opened, sending the prompt message to the wearable device to indicate the state of the entrance to the user via the wearable device;
   wherein the server device determines whether the user is located in the target place based on the first message and the pre-stored message corresponding to the target place comprises:
      when the first message is a first device list and the pre-stored message is a second device list, detecting whether the user is located in the target place based on a similarity between the first device list and the second device list, the first device list being a list of devices which are connected in a first network covering a place where the user is currently located, and the second device list being a list of devices which are connected in a second network covering the target place; and
      when the first message is a first location message of the wearable device of the user and the pre-stored message is a second location message of the target place, detecting whether the user is located in the target place based on the first location message and the second location message; and
   wherein when the first location message is a geographic position message of the wearable device and the second location message is a geographic position message of the target place, detecting whether a distance between the wearable device and the target place is less than a predetermined threshold; and
   when the first location message is an Internet Protocol (IP) address of the wearable device and the second location message is an address of a network segment corresponding to the target place, detecting whether the IP address of the wearable device is contained in the address of the network segment.

* * * * *